United States Patent [19]
Hombach et al.

[11] 3,843,590
[45] Oct. 22, 1974

[54] PRESSURE SENSITIVE ADHESIVE

[75] Inventors: Rudolf Hombach, Cologne-Flittard; Dieter Theisen, Remscheid, both of Germany

[73] Assignee: Bayer Aktiengesellschaft, Leverkusen, Germany

[22] Filed: Apr. 2, 1973

[21] Appl. No.: 346,930

Related U.S. Application Data

[62] Division of Ser. No. 243,415, April 12, 1972, Pat. No. 3,763,067.

[30] Foreign Application Priority Data

Apr. 14, 1971  Germany........................... 2118020

[52] U.S. Cl................ 260/33.6 A, 260/38, 260/848
[51] Int. Cl.............................................. C09j 3/26
[58] Field of Search ..... 260/33.6 A, 848, 844, 93.1, 260/38

[56] References Cited
UNITED STATES PATENTS

| | | | |
|---|---|---|---|
| 3,492,278 | 1/1970 | Uraneck et al. | 260/93.1 |
| 3,607,853 | 9/1971 | Oberkirch et al. | 260/93.1 |
| 3,624,060 | 11/1971 | Judy | 260/93.1 X |

OTHER PUBLICATIONS

I. Skeist, ed., Handbook of Adhesives, (1962), pp. 584–7.

Primary Examiner—Morris Liebman
Assistant Examiner—Sandra M. Person
Attorney, Agent, or Firm—Connolly and Hutz

[57]                ABSTRACT

Contact adhesives from polyalkenamers containing at least one polyalkenamer dissolved in an inert organic solvent, 10 to 250 percent by weight, based on the polyalkenamer, of a natural or synthetic resin, 0 to 5 percent by weight, based on the polyalkenamer, of an age resister and 0 to 100 percent by weight of a filler and/or pigment, based on the polymer.

11 Claims, No Drawings

PRESSURE SENSITIVE ADHESIVE

CROSS-REFERENCE TO RELATED APPLICATION

This application is a division of application Ser. No. 243,415 filed Apr. 12, 1972, now U.S. Pat. No. 3,763,067.

Pressure sensitive adhesives obtained from natural rubber are widely used in adhesive tapes and adhesive labels. Products covered with such pressure sensitive adhesives will stick on very slight pressure at room temperature and do not lose this property even after prolonged storage. The natural rubber to be used for this purpose, however, must first be masticated so that it can be applied easily, e.g., to an adhesive tape by brushing. This involves time and labour.

Another disadvantage of pressure sensitive adhesives containing natural rubber is their cold flow, their tendency to become brittle and their limited capacity for taking up fillers which are added in order to reduce the plasticity of the adhesives.

It has now been found that pressure sensitive adhesives which are very easily applied by brush and which retain their adhesive property for a long time can be made from polyalkenamers.

This invention therefore relates to contact adhesives which are composed of at least one polyalkenamer dissolved in an inert organic solvent, 10 to 250 percent by weight, based on the polyalkenamer, of a natural or synthetic resin, 0 to 5 percent by weight, based on the polyalkenamer, of an anti-ageing composition and 0 to 100 percent by weight of a filler and/or pigment, based on the polyalkenamer.

Another object of the invention is a process for the preparation of contact adhesives from polyalkenamers wherein at least one polyalkenamer is dissolved in an inert organic solvent and 10 to 250 percent by weight of a natural or synthetic resin, based on the polyalkenamer, 0 to 5 percent by weight of an age resister, based on the polyalkenamer and 0 to 100 percent by weight of a filler and/or pigment, based on the polyalkenamer, are added.

Suitable polyalkenamers for the pressure sensitive adhesives according to the invention are any polyalkenamers and their mixtures which are obtained by ring opening polymerisation of cycloalkenes having 5 or 7 to 12 carbon atoms and an olefinic double bond in the ring. Polymers in which a high proportion of the carbon-carbon double bonds are in trans configuration, such as those which are obtained by the process described in published French Pat. application No. 7 104 888 using tungsten/aluminium catalysts, are particularly suitable. It is preferred to use polymers having a Mooney plasticity ML–4 (100°C) (DIN 53 523) of 20 to 200.

The polyalkenamer is preferably dissolved in an inert organic solvent at a concentration of 10 to 20 percent by weight, based on the solution, most preferably 10 to 15 percent by weight. Most suitable solvents are, e.g. liquid aliphatic hydrocarbons such as n-hexane or heptane or liquid mixtures of aliphatic hydrocarbons such as gasoline fractions boiling in the range of 65° to 95°C, cycloaliphatic hydrocarbons such as cyclohexane, aromatic hydrocarbons such as benzene, toluene or xylene, the corresponding chlorinated compounds such as chlorobenzene, trichloroethylene or methylene chloride or mixtures thereof.

A synthetic or natural resin is added to the polymer solution in quantities of 10 to 250 percent by weight, based on the polymer.

Especially suitable natural resins are the colophony resins, e.g., esters or unmodified or modified colophony and among these particularly the esters of hydrogenated, disproportionated or dimerised colophony, or polyterpene resins.

Any synthetic resins which increase the bond strength of the mixture are suitable as additives. The additive may also consist of a mixture of synthetic resins, a mixture of natural or synthetic resins or a mixture of natural resins. Among the synthetic resins, terpene-phenol resins, coumarone resins and phenol-formaldehyde resins are especially suitable.

Fillers and pigments such as zinc oxide, titanium oxide, aluminium oxide, lithopones, chalk, siliceous chalk, heavy spar, finely dispersed silicic acid and carbon black are added in quantities of 0 to 100 percent by weight, based on the polyalkenamer, to reduce the plasticity of the adhesives. The fillers are preferably added in the form of a triturate obtained on a ball mill.

Any reduction in the bond strength of the adhesives during storage is prevented by the addition of 0 to 5 percent by weight based on the polyalkenamer of an anti-ageing compound. The known stabilisers such as sterically hindered amines and phenols are used for this purpose.

The adhesives according to the invention can be coated onto the materials to be bonded by means of continuously or intermittently operating coating apparatus in known manner. Suitable materials which can be bonded by the adhesives according to the invention are, in particular, paper, flexible synthetic resin foils (from plasticised polyvinyl chloride, cellophane, polyethylene, terephthalic acid polyester, polystyrene, etc.) and textile fabrics or fleeces made of natural or synthetic fibres of the kind commonly used for the manufacture of adhesive tapes.

This invention therefore also relates to adhesive tapes in which the adhesive layer consists of a mixture of at least one polyalkenamer, 10 to 250 percent by weight of a natural or synthetic resin, based on the polyalkenamer, 0 to 5 percent by weight of an age resister, based on the polyalkenamer, and 0 to 100 percent by weight of a filler and/or pigment, based on the polyalkenamer.

Adhesive A 100 g of trans-polypentenamer having a Mooney plasticity ML–4' (100°C) of 46,75 of terpene-phenol resin(softening range 76°–88°C) and 2 g of 2,6-di-tert.-butyl-p-cresol (anti-ageing compound) were dissolved in 825 g of a 9:1 mixture of petroleum hydrocarbons and benzene with slow stirring.

Adhesive B has the same composition as Adhesive A except that a trans-polypentenamer having a Mooney plasticity ML–4' (100°C) of 70 was used.

Adhesive C has the same composition as Adhesive A except that a trans-polypentenamer having a mooney plasticity ML–4' (100°C) of 94 was used.

Adhesive D has the same composition as Adhesive A except that a trans-polypentenamer having a Mooney plasticity ML–4' (100°C) of 122 was used.

Adhesive E 75 g of zinc oxide were incorporated in 100 g of a trans-polypentenamer having a Mooney plasticity ML-4' (100°C) of 77 on rollers. This mixture together with 150 g of terpene-phenol resin (softening range 76°-88°C) and 2 g of the age resister 2,6-di-tert.-butyl-p-cresol was dissolved in 725 g of 9 : 1 mixture of petroleum hydrocarbons and benzene with slow stirring.

Adhesive F 100 g of trans-polypentenamer having a Mooney plasticity ML-4' (100°C) of 77, 150 g of terpene-phenol resin (softening range 76°-88°C) and 2 g of the age resister 2,6-di-tert.-butyl-p-cresol were dissolved in 750 g of a 9:1 mixture of petroleum hydrocarbons and benzene with slow stirring. 75 g of zinc oxide which had previously been triturated with a small quantity of benzene in a ball mill were introduced into this solution.

Adhesive G 100 g of trans-polypentenamer having a Mooney plasticity ML-4' (100°C) of 77, 75 g of polyterpene resin (softening point 115°C) and 2 g of the age resister 2,6-di-tert.-butyl-p-cresol were dissolved in 825 g of a 9:1 mixture of petroleum hydrocarbons and benzene with slow stirring.

Adhesive H (Comparison to A)

100 g of natural rubber (pale crepe) which had been masticated at 60°C for 5 minutes, 75 g of terpene-phenol resin (softening range 76°-88°C) and 2 g of the age resister 2,6-di-tert.-butyl-p-cresol were dissolved in 825 g of a 9:1 mixture of petroleum hydrocarbons and benzene with slow stirring.

Adhesives A to H were applied to a polyethylene glycol terephthalate foil 50 μ in thickness with a coating knife. The quantity of solids applied was about 100 g. After application of the adhesives, the coated foils were stored under dust-free conditions to enable the solvent to evaporate until they were tested.

Bond strength test

To test the bond strength of the adhesives, strips measuring 30 ×1.5 cm were cut out of the coated foils and, using a test method based on test method 4001 P 7 of AFERA (Association des Fabricants Europeens de Rubans Autoadhesifs) they were applied to a high gloss refined steel plate in such a way that no bubbles were trapped and they were then pressed on to the plate by rolling a 3 kg aluminum roller over them twice.

After 30 minutes' storage, the adhesive tapes were stripped from the steel plate at the rate of 300 mm per minute at a stripping angle of 180°. The forces required for this operation are shown in the Table below.

Heat endurance test

To test the heat endurance, strips 2 cm in width were stuck over a length of 1 cm to the refined steel plate previously used for the bond strength test. A weight of 0.5 kg was attached to the free end of the adhesive tape.

The length of time for which the bonds could withstand the given load of 0.5 kg at a test temperature of 50°C was recorded. The results obtained are also indicated in the following Table.

Table I

| Example | Adhesive | Bond Strength (p/cm) | Heat endurance (minutes) |
|---|---|---|---|
| 1 | A | 1500 | 6 |
| 2 | B | 1660 | 7 |
| 3 | C | 1340 | 5 |
| 4 | D | 1260 | 6 |
| 5 | E | 1250 | 7 |
| 6 | F | 800 | 6 |
| 7 | G | 870 | 4 |
| 8 | H | 400 | 2 |

It is clear from the bond strength and heat endurance values shown in Table I that the adhesives according to the invention have very high bond strength and heat endurance.

We claim:

1. An adhesive composition comprising at least one polyalkenamer, dissolved in an inert organic solvent and 10 to 250 percent by weight, based on the polyalkenamer, of a phenol-formaldehyde resin.

2. The adhesive composition of claim 1 which contains up to 5 percent by weight, based on the polyalkenamer, of an anti-ageing compound.

3. The adhesive composition of claim 1 which contains up to 100 percent by weight, based on the polyalkenamer, of a filler, pigment or mixture thereof.

4. The adhesive composition of claim 1 wherein the polyalkenamer has a high proportion of trans double bonds.

5. The adhesive composition of claim 1 wherein the polyalkenamer is polypentenamer.

6. The adhesive composition of claim 2 wherein the anti-ageing compound is a sterically hindered phenol or amine.

7. The adhesive composition of claim 3 wherein the filler, pigment or mixture thereof is selected from the group consisting of zinc oxide, titanium oxide, aluminum oxide, lithopone, chalk, siliceous chalk, heavy spar, finely dispersed silica, carbon black and mixtures thereof.

8. The adhesive composition of claim 1 wherein the solvent is an aliphatic, aromatic or cycloaliphatic hydrocarbon which may be chlorinated, or a mixture thereof.

9. A process for the preparation of an adhesive composition in which at least one polyalkenamer, dissolved in an inert organic solvent, is mixed with 10 to 250 percent by weight, based on the polyalkenamer, of a phenol-formaldehyde resin.

10. An adhesive material comprising a substrate having applied therto a layer of the adhesive composition of claim 1.

11. The adhesive material of claim 1 in the form of a tape.

* * * * *